US007763179B2

(12) United States Patent
Levy et al.

(10) Patent No.: US 7,763,179 B2
(45) Date of Patent: Jul. 27, 2010

(54) COLOR LASER ENGRAVING AND DIGITAL WATERMARKING

(75) Inventors: Kenneth L. Levy, Stevenson, WA (US); Brian LaBrec, North Oxford, MA (US); Robert Jones, Andover, MA (US)

(73) Assignee: Digimarc Corporation, Beaverton, OR (US)

( * ) Notice: Subject to any disclaimer, the term of this patent is extended or adjusted under 35 U.S.C. 154(b) by 1473 days.

(21) Appl. No.: 10/742,510

(22) Filed: Dec. 19, 2003

(65) Prior Publication Data

US 2005/0001419 A1 Jan. 6, 2005

Related U.S. Application Data

(60) Provisional application No. 60/456,677, filed on Mar. 21, 2003.

(51) Int. Cl.
*C03C 15/00* (2006.01)
*C03C 25/68* (2006.01)

(52) U.S. Cl. ............................ 216/94; 219/129; 281/2; 283/113

(58) Field of Classification Search .................. 216/94; 281/2; 283/113; 219/129
See application file for complete search history.

(56) References Cited

U.S. PATENT DOCUMENTS

| | | | |
|---|---|---|---|
| 3,153,166 | A | 10/1964 | Thornton, Jr. et al. |
| 3,413,171 | A | 11/1968 | Hannon |
| 3,582,439 | A | 6/1971 | Thomas |
| 3,614,839 | A | 10/1971 | Thomas |
| 3,758,970 | A | 9/1973 | Annenberg |
| 3,860,558 | A | 1/1975 | Klemchuk |
| 3,975,291 | A | 8/1976 | Claussen et al. |
| 4,035,740 | A | 7/1977 | Schafer et al. |
| 4,051,374 | A | 9/1977 | Drexhage et al. |
| 4,072,911 | A | 2/1978 | Walther et al. |
| 4,096,015 | A | 6/1978 | Kawamata et al. |

(Continued)

FOREIGN PATENT DOCUMENTS

| | | |
|---|---|---|
| EP | 190997 B1 | 8/1986 |

(Continued)

OTHER PUBLICATIONS

PCT-Notification of Transmittal of the International Search Report or the Declaration and International Search Report for International Application No. PCT/US02/41681, mailed on Jun. 5, 2003.

(Continued)

*Primary Examiner*—Shamim Ahmed
*Assistant Examiner*—Mahmoud Dahimene

(57) ABSTRACT

A color laser engraving method engraves a document including a surface layer and one or more sub-layers. The sub-layer includes different colors and orientations of ink. A laser provides openings in the surface layer—to expose color ink in the sub-layer—to create color images and/or text. The different orientations of the colored inks include, e.g., circular, linear and overlapped groupings of ink. A sub-layer preferably includes many repeated instances of the grouping. A digital watermark is embedded in a document via transfer of the digital watermark in an embedded image or text, or by pre-embedding the document via altering intensity of colored inks on the original document card stock. A digital watermark can be carried via modulation with a pseudo-random noise sequence.

9 Claims, 5 Drawing Sheets

U.S. PATENT DOCUMENTS 4,100,509 A 7/1978 Walther et al.
4,131,337 A 12/1978 Moraw et al.
4,171,766 A 10/1979 Ruell
4,256,900 A 3/1981 Raue
4,271,395 A 6/1981 Brinkmann et al.
4,274,062 A 6/1981 Brinkmann et al.
4,289,957 A 9/1981 Neyroud et al.
4,301,091 A 11/1981 Schieder et al.
4,304,809 A 12/1981 Moraw et al.
4,313,984 A 2/1982 Moraw et al.
4,317,782 A 3/1982 Eckstein et al.
4,324,421 A 4/1982 Moraw et al.
4,326,066 A 4/1982 Eckstein et al.
4,338,258 A 7/1982 Brinkwerth et al.
4,356,052 A 10/1982 Moraw et al.
4,384,973 A 5/1983 Harnisch
4,467,209 A 8/1984 Maurer et al.
4,468,468 A 8/1984 Benninghoven et al.
4,507,346 A 3/1985 Maurer et al.
4,510,311 A 4/1985 Eckstein
4,523,777 A 6/1985 Holbein et al.
4,527,059 A 7/1985 Benninghoven et al.
4,544,181 A 10/1985 Maurer et al.
4,551,265 A 11/1985 Brinkwerth et al.
4,579,754 A 4/1986 Maurer et al.
4,596,409 A 6/1986 Holbein et al.
4,597,592 A 7/1986 Maurer et al.
4,597,593 A 7/1986 Maurer
4,621,271 A 11/1986 Brownstein
4,629,215 A 12/1986 Maurer et al.
4,653,775 A 3/1987 Raphael et al.
4,654,290 A 3/1987 Spanjer
4,663,518 A 5/1987 Borror et al.
4,670,882 A 6/1987 Telle et al.
4,672,891 A 6/1987 Maurer et al.
4,675,746 A 6/1987 Tetrick et al.
4,687,526 A 8/1987 Wilfert
4,711,690 A 12/1987 Haghiri-Tehrani
4,732,410 A 3/1988 Holbein et al.
4,735,670 A 4/1988 Maurer et al.
4,738,949 A 4/1988 Sethi et al.
4,748,452 A 5/1988 Maurer
4,751,525 A 6/1988 Robinson
4,754,128 A 6/1988 Takeda et al.
4,765,656 A 8/1988 Becker et al.
4,766,026 A 8/1988 Lass et al.
4,803,114 A 2/1989 Schledorn
4,816,372 A 3/1989 Schenk et al.
4,816,374 A 3/1989 Lecompte
4,822,973 A 4/1989 Fahner et al.
4,889,749 A 12/1989 Ohashi et al.
4,894,110 A 1/1990 Lass et al.
4,959,406 A 9/1990 Foltin et al.
4,968,063 A 11/1990 McConville et al.
4,999,065 A 3/1991 Wilfter
5,005,872 A 4/1991 Lass et al.
5,024,989 A 6/1991 Chiang et al.
5,060,981 A 10/1991 Fossum et al.
5,061,341 A 10/1991 Kildal et al.
5,100,711 A 3/1992 Satake et al.
5,122,813 A 6/1992 Lass et al.
5,128,779 A 7/1992 Mallik
5,138,070 A 8/1992 Berneth
5,138,604 A 8/1992 Umeda et al.
5,156,938 A 10/1992 Foley et al.
5,157,424 A 10/1992 Craven et al.
5,169,707 A 12/1992 Faykish et al.
5,215,864 A 6/1993 Laakmann
5,216,543 A 6/1993 Calhoun
5,234,890 A 8/1993 Burberry et al.
5,240,900 A 8/1993 Burberry
5,261,987 A 11/1993 Luening et al.
5,289,547 A 2/1994 Ligas et al.
5,294,774 A 3/1994 Stone
5,298,922 A 3/1994 Merkle et al.
5,304,789 A 4/1994 Lob et al.
5,337,361 A 8/1994 Wang et al.
5,393,099 A 2/1995 D'Amato
5,421,619 A 6/1995 Dyball
5,449,200 A 9/1995 Andric et al.
5,454,598 A 10/1995 Wicker
5,474,875 A 12/1995 Loerzer et al.
5,489,639 A 2/1996 Faber et al.
5,509,693 A 4/1996 Kohls
5,523,125 A 6/1996 Kennedy et al.
5,529,345 A 6/1996 Kohls
5,550,346 A 8/1996 Andriash et al.
5,576,377 A 11/1996 El Sayed et al.
5,585,017 A * 12/1996 James et al. ........... 219/121.71
5,633,119 A 5/1997 Burberry et al.
5,639,819 A 6/1997 Farkas et al.
5,671,005 A 9/1997 McNay et al.
5,698,296 A 12/1997 Dotson
5,717,018 A 2/1998 Magerstedt et al.
5,719,667 A 2/1998 Miers
5,745,308 A 4/1998 Spangenberg
5,768,001 A 6/1998 Kelley et al.
5,769,301 A 6/1998 Hebert et al.
5,795,643 A 8/1998 Steininger et al.
5,801,857 A 9/1998 Heckenkamp et al.
5,815,292 A 9/1998 Walters
5,816,619 A 10/1998 Schaede
5,824,715 A 10/1998 Hayashihara et al.
5,840,791 A 11/1998 Magerstedt et al.
5,841,886 A 11/1998 Rhoads
5,844,685 A 12/1998 Gontin
5,853,955 A 12/1998 Towfiq
5,855,969 A 1/1999 Robertson
5,866,644 A 2/1999 Mercx et al.
5,867,199 A 2/1999 Knox et al.
5,872,627 A 2/1999 Miers
5,895,074 A 4/1999 Chess et al.
5,936,986 A 8/1999 Cantatore et al.
5,944,356 A 8/1999 Bergmann et al.
5,965,242 A 10/1999 Patton et al.
5,973,842 A 10/1999 Spangenberg
5,977,514 A 11/1999 Feng et al.
6,007,929 A 12/1999 Robertson et al.
6,017,972 A 1/2000 Harris et al.
6,022,905 A 2/2000 Harris et al.
6,028,134 A 2/2000 Zhang et al.
6,036,807 A 3/2000 Brongers
6,037,102 A 3/2000 Loerzer et al.
6,042,249 A 3/2000 Spangenberg
6,054,170 A 4/2000 Chess et al.
6,066,594 A 5/2000 Gunn et al.
6,075,223 A 6/2000 Harrison
6,086,971 A 7/2000 Haas et al.
6,107,010 A 8/2000 Corniglion et al.
6,110,864 A 8/2000 Lu
6,122,403 A 9/2000 Rhoads
6,127,475 A 10/2000 Vollenberg et al.
6,143,852 A 11/2000 Harrison et al.
6,165,687 A * 12/2000 Reele ......................... 430/293
6,169,266 B1 * 1/2001 Hughes ................. 219/121.68
6,179,338 B1 1/2001 Bergmann et al.
6,207,344 B1 3/2001 Ramlow et al.
6,214,916 B1 4/2001 Mercx et al.
6,214,917 B1 4/2001 Linzmeir et al.
6,221,552 B1 4/2001 Street et al.
6,238,840 B1 5/2001 Hirayama et al.
6,291,551 B1 9/2001 Kniess et al.
6,302,444 B1 10/2001 Cobben
6,313,436 B1 11/2001 Harrison

| | | | | |
|---|---|---|---|---|
| 6,326,128 | B1 | 12/2001 | Telser et al. | |
| 6,372,394 | B1 | 4/2002 | Zientek | |
| 6,400,386 | B1 | 6/2002 | No et al. | |
| 6,413,687 | B1 | 7/2002 | Hattori et al. | |
| 6,444,068 | B1 | 9/2002 | Koops et al. | |
| 6,446,865 | B1 | 9/2002 | Holt et al. | |
| 6,475,588 | B1 | 11/2002 | Schottland et al. | |
| 6,614,914 | B1 | 9/2003 | Rhoads et al. | |
| 6,712,397 | B1 | 3/2004 | Mayer et al. | |
| 6,752,432 | B1 | 6/2004 | Richardson | |
| 6,794,115 | B2 | 9/2004 | Telser et al. | |
| 6,827,283 | B2 | 12/2004 | Kappe et al. | |
| 6,888,853 | B1 * | 5/2005 | Jurgensen | 372/6 |
| 6,986,926 | B2 | 1/2006 | Fannasch et al. | |
| 7,198,302 | B1 * | 4/2007 | Fannasch et al. | 283/100 |
| 2002/0018430 | A1 | 2/2002 | Heckenkamp et al. | |
| 2002/0027359 | A1 | 3/2002 | Cobben et al. | |
| 2002/0146549 | A1 | 10/2002 | Kranenburg-Van Dijk et al. | |
| 2003/0117262 | A1 | 6/2003 | Anderegg et al. | |
| 2003/0141358 | A1 | 7/2003 | Hudson et al. | |
| 2003/0178487 | A1 | 9/2003 | Rogers | |
| 2003/0178495 | A1 | 9/2003 | Jones et al. | |
| 2003/0189098 | A1 * | 10/2003 | Tsikos et al. | 235/454 |
| 2003/0234286 | A1 | 12/2003 | Labrec et al. | |
| 2004/0011874 | A1 | 1/2004 | Theodossiou et al. | |
| 2004/0076310 | A1 | 4/2004 | Hersch et al. | |
| 2004/0245346 | A1 | 12/2004 | Haddock | |

FOREIGN PATENT DOCUMENTS

| | | |
|---|---|---|
| EP | 697433 | 2/1996 |
| GB | 1088318 | 10/1967 |
| GB | 2132136 | 7/1984 |
| GB | 2240948 | 8/1991 |
| WO | WO 89/05730 | 6/1989 |
| WO | WO 91/16722 | 10/1991 |
| WO | WO 94/12352 | 6/1994 |
| WO | WO 96/35585 | 11/1996 |
| WO | WO97/01446 | 1/1997 |
| WO | WO 97/16318 | 5/1997 |
| WO | WO 97/48016 | 12/1997 |
| WO | WO 98/19868 | 5/1998 |
| WO | WO98/19869 | 5/1998 |
| WO | WO 00/43214 | 7/2000 |
| WO | WO00/43216 | 7/2000 |
| WO | WO00/45344 | 8/2000 |
| WO | WO 00/78554 | 12/2000 |
| WO | WO 01/00719 | 1/2001 |
| WO | WO 01/45559 | 6/2001 |
| WO | WO 02/42371 | 5/2002 |
| WO | WO03/055684 | 7/2003 |

OTHER PUBLICATIONS

PCT-Notification of Transmittal of the International Search Report or the Declaration and International Search Report for International Application No. PCT/US02/41644, mailed on May 30, 2003.

* cited by examiner

COLOR LASER ENGRAVING AND DIGITAL WATERMARKING

RELATED APPLICATION DATA

The present application claims the benefit of U.S. Provisional Patent Application No. 60/456,677, filed Mar. 21, 2003. The present application is also related to U.S. patent application Ser. Nos. 10/613,913, filed Jul. 3, 2003 (published as U.S. 2004-0125983A1) and Ser. No. 10/330,034, filed Dec. 24, 2002 (published as U.S. 2003-0234292A1). The Ser. No. 10/613,913 application is a continuation of U.S. patent application Ser. No. 09/553,084 (now U.S. Pat. No. 6,590,996). Each of the above patent documents is herein incorporated by reference.

FIELD OF USE

The present invention relates generally to laser engraving. Some of the implementations disclosed herein relate to color laser engraving identification documents and to digital watermarking with color laser engraving.

BACKGROUND AND SUMMARY

Laser engraving is used to personalize or to convey indicia on an identification document, including creating images and/or information (e.g., text and graphics) on the identification document. Engraving is a secure way to impart indicia to a document, because the indicia becomes part of the document.

For the purposes of this disclosure, identification documents are broadly defined and may include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments or documentation, security clearance badges and cards, gun permits, gift certificates or cards, labels or product packaging, membership cards or badges, etc., etc. Also, the terms "document," "card," and "documentation" are used interchangeably throughout this patent document. Identification documents are also sometimes referred to as "ID documents."

Identification documents can include information such as a photographic image, a bar code (e.g., which may contain information specific to the person whose image appears in the photographic image, and/or information that is the same from ID document to ID document), variable personal information (e.g., such as an address, signature, and/or birth date, biometric information associated with the person whose image appears in the photographic image, e.g., a fingerprint), a magnetic stripe (which, for example, can be on a side of the ID document that is opposite a side with a photographic image), and various designs (e.g., a security pattern like a printed pattern comprising a tightly printed pattern of finely divided printed and unprinted areas in close proximity to each other, such as a fine-line printed security pattern as is used in the printing of banknote paper, stock certificates, and the like). Of course, an identification document can include more or less of these types of features.

One exemplary ID document comprises a core layer (which can be pre-printed), such as a light-colored, opaque material, e.g., TESLIN, which is available from PPG Industries) or polyvinyl chloride (PVC) material. The core can be laminated with a transparent material, such as clear PVC to form a so-called "card blank". Information, such as variable personal information (e.g., photographic information, address, name, document number, etc.), is printed on the card blank using a method such as Dye Diffusion Thermal Transfer ("D2T2") printing (e.g., as described in commonly assigned U.S. Pat. No. 6,066,594, which is herein incorporated by reference), laser or inkjet printing, offset printing, etc. The information can, for example, comprise an indicium or indicia, such as the invariant or nonvarying information common to a large number of identification documents, for example the name and logo of the organization issuing the documents.

To protect information printed on a document, an additional layer of transparent overlaminate can be coupled to the document to cover the printed information. Illustrative examples of usable materials for overlaminates include biaxially oriented polyester or other optically clear durable plastic film.

One type of identification document 100 is illustrated with reference to FIG. 8. The identification document includes a substrate/core 120 perhaps with a protective or decorative overlaminate 112 or 112'. The identification document 100 optionally includes a variety of other features like a photograph 104, ghost or faint image 106, fixed information 108 (e.g., information which is generally the same from ID document to ID document), signature 110, other machine-readable information (e.g., bar codes, 2D bar codes, information stored in optical memory) 114, variable information (e.g., information which generally varies from document to document, like bearer's name, address, document number) 116, etc. The document 100 may also include overprinting (e.g., DOB over image 106), microprinting, graphics, seals and background-patterns (all not shown).

Of course, there are many other physical structures/materials and other features that can be suitably interchanged for use with the laser engraving techniques described herein. The inventive techniques disclosed in this patent document will similarly benefit these other documents as well.

We disclose herein laser-engraving methods to enhance identification documents.

Lasers (e.g., $CO_2$ or YaG lasers) can be used for marking, writing, bar coding, and engraving many different types of materials, including plastics. Lasers have been used, for example, to mark plastic materials to create indicia such as bar codes, date codes, part numbers, batch codes, and company logos. It will be appreciated that laser engraving or marking generally involves a process of inscribing or engraving a document surface with identification marks, characters, text, tactile marks—including text, patterns, designs (such as decorative or security features), photographs, etc.

One way to laser mark thermoplastic materials involves irradiating a material, such as a thermoplastic, with a laser beam at a given radiation. The area irradiated by the laser absorbs the laser energy and produces heat, which causes a visible discoloration in the thermoplastic. The visible discoloration serves as a "mark" or indicator, and usually appears gray. Lasers can also be focused to burrow through or burn away a material to create a hole or opening.

One inventive color laser engraving method involves providing a card stock including a top surface layer and one or more sub-layers. The sub-layers include various colors and arrangements of inks, dyes or pigments. (The terms "ink," "dye" and "pigments" are hereafter used interchangeably). We provide openings (e.g., holes) in the surface layer to reveal one or more sub-layers. The openings allow different sub-layer color inks to convey a color image.

A digital watermark can be conveyed in the engraved, color image. For example, one or more digital watermarks are embedded in an image or text. The embedded image or text is used as a master pattern to guide laser engraving. A resulting engraved image or text will include the one or more digital watermarks, since the watermarks are transferred along with the image and text.

In other embodiments, digital watermarks are pre-embedded into a document by changing intensity or luminance of color ink provided in or on a sub-layer. The sub-layer's color changes become evident as openings are created in a surface layer. Changing or removing the digital watermark is difficult since the watermark is physically part of the card through laser engraving. This digital watermark can provide, e.g., an inventory control number for card stock, which is inherently embedded in the card stock and becomes detectable after the laser engraving process. In some implementations our "pre-embedded" watermark is embedded in addition to a watermark conveyed with an engraved image.

One aspect of the invention is a method of digitally watermarking a document that is to receive laser engraving. The method includes: providing one or more sub-layers, the one or more sub-layers to include coloration; providing variations in the coloration in terms of at least one of color intensity and color contrast, the variations conveying a digital watermark including a plural-bit message; and arranging a surface layer over the one or more sub-layers. The digital watermark is machine-readable after laser engraving.

Another aspect of the invention is an identification document. The identification document includes a sub-layer including a plurality of inks arranged in a grouping. The sub-layer includes repeated instances of the grouping. The identification document further includes a surface layer adjacently arranged with the sub-layer. The surface layer obscures at least a majority of the repeated instances of the grouping. The identification document further has a plurality of openings in the surface layer, wherein at least some portions of some of the repeated instances of the grouping are perceptible through the plurality of openings to convey an image or text.

Yet another aspect of the present invention is a method of color laser engraving a document. The document includes a multi-layer structure including a surface layer and one or more sub-layers. The one or more sub-layers include coloring. The method includes receiving the document; and selectively providing openings in the surface layer with a laser to expose one or more of the sub-layers. The coloring is perceptible through the openings.

The foregoing and other features, aspects and advantages of the present invention will be even more readily apparent from the following detailed description, which proceeds with reference to the accompanying drawings.

DETAILED DESCRIPTION

Multi-Layers

Figure 1A:
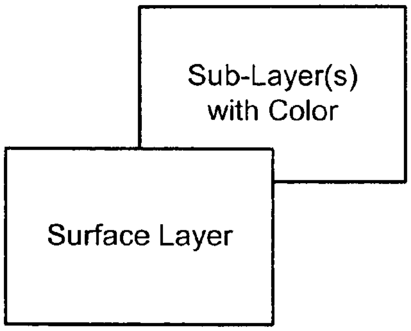
FIG. 1A is an exploded view showing a document including a surface layer and a sub-layer.

An identification document is provided for laser engraving. The identification document preferably includes a multi-layered structure. For example, with reference to FIG. 1A, the identification document includes at least a surface layer and a sub-layer. The surface layer may include one or more layers. One or more of the surface layers preferably provide at least some coverage for the sub-layer. That is, one or more of the surface layers obscures at least a portion of the sub-layer. (One of the surface layers may optionally include a clear laminate, and another surface layer may include an obscuring layer.) The sub-layer may also include one or more sub-layers. The one or more sub-layers include color provided thereon. (Color can be provided by a number of techniques including ink, dye, pigment, etc., which are used interchangeably herein.). In one implementation, the sub-layer comprises a sandwiched structure, with a top and bottom polycarbonate or plastic layer sandwiching one or more sub-layers. In another implementation, the sub-layer is provided directly adjacent to the surface layer.

Figure 1B:
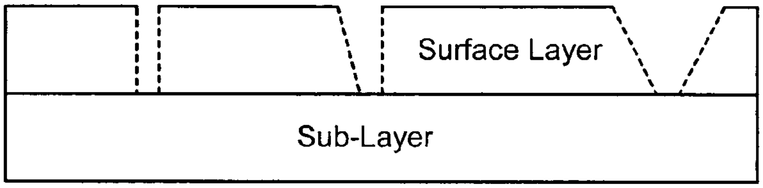
FIG. 1B is a cross-sectional view of a portion of the FIG. 1A document, including openings (represented by dashed lines) in the surface layer.

A laser engraving or ablation process creates openings in the surface layer to selectively reveal coloration on or in the sub-layer. An image or text is conveyed through a collective arrangement of sub-layer colors that are perceptible through a plurality of surface layer openings. FIG. 1B is a cross-sectional view of a portion of the FIG. 1A document. The cross-sectional view includes three openings (shown by dashed lines) in the surface layer that reveal the coloration of the sub-layer. The openings are illustrated as having different cuts, e.g., a straight cut and two variously tapering cuts. The cuts are illustrated as such to emphasize that the openings can take different forms, e.g., to allow for viewing from different observation angles or to allow for different coloration intensity. Thus, the illustrated openings are provided by example only, and should not limit the scope of the present invention.

There are many possible arrangements for ink (or more generally, "color") on a sub-layer.

Color Groupings and Engraving

Figure 2A:
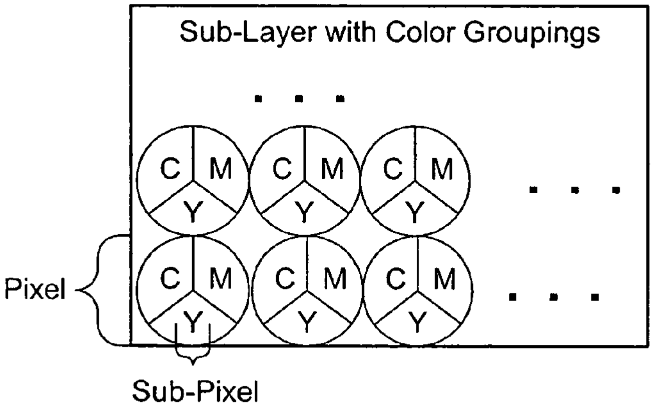
FIG. 2A shows a sub-layer having repeated instances of a cyan, magenta and yellow (CMY) generally circular grouping.

In a first implementation, as illustrated in FIG. 2A, a sub-layer includes a single color layer. Ink groupings are preferably arranged in columns and rows. Each grouping includes a plurality of colors, e.g., cyan (C), magenta (M) and yellow (Y); cyan (C), magenta (M), yellow (Y) and black (K); or first spot color (S1), second spot color (S2) and black (K). Of course, other color combinations are possible. A single ink grouping can be viewed as a pixel, and an individual color within a pixel can be viewed as a sub-pixel (e.g., yellow as in FIG. 2A).

A laser engraves, burns or cuts an opening through a surface layer to reveal a desired sub-pixel. For example, an image (or data representing color of the image), which is used to guide laser engraving, indicates that at column 21, row 8, the pixel should be magenta. The laser creates or burns an opening at that location so that magenta is perceptible through the opening. The laser is preferably focused so as to burn through the surface layer, but not to burn all the way through the color on the sub-layer. In some cases, the surface layer includes an opaque layer over a clear buffering layer. The laser is focused to burn through the opaque layer, but not completely through the clear layer. The size of an opening is varied to control intensity of a sub-pixel (e.g., a larger opening provides more color intensity). A plurality of pixels is activated (e.g., openings are provided above sub-pixels) to convey the image on the identification document.

Figure 2B:
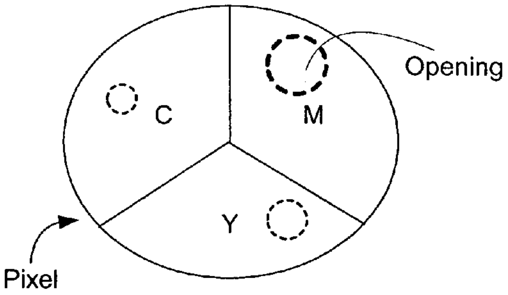
FIG. 2B illustrates a top view of a FIG. 2A pixel including three openings (represented by dashed lines) spatially positioned over sub-pixels.
Figure 2C:
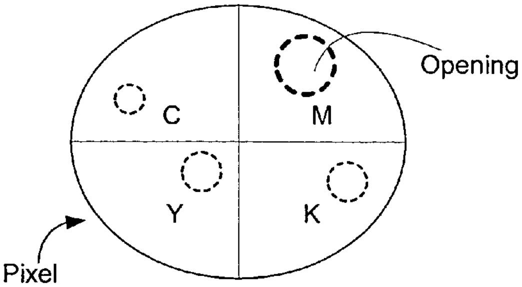
FIG. 2C illustrates including a black (K) channel in a pixel grouping.

A plurality of openings can be engraved per pixel. For example, three or more openings can be provided—with each opening being spatially positioned over a sub-pixel. FIGS. 2B and 2C illustrate openings as dashed circles. The three openings in FIG. 2B vary in size to achieve a particular color combination and intensity. Four openings are used in FIG. 2C since there are four colors per pixel in the sub-layer. Opening size is related to color intensity. A larger opening allows for a more intense color contribution of a particular color sub-pixel. Color contributions from the three sub-pixels allow for a large range of colors per pixel. The openings are sized to have a sub-pixel's contribution be more or less significant relative to its adjacent sub-pixels.

Figure 3A:
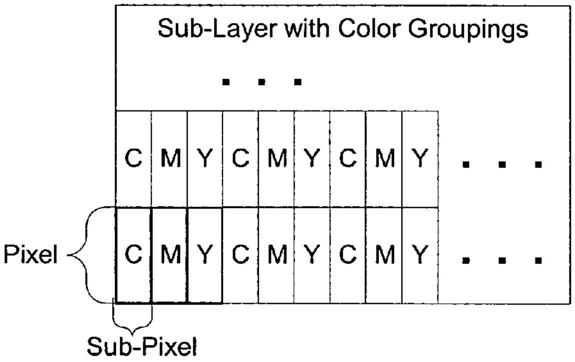
FIG. 3A shows a sub-layer having repeated instances of a cyan, magenta, and yellow (CMY) linear grouping.
Figure 3B:
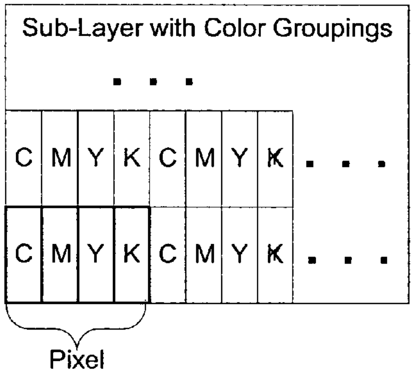
FIG. 3B shows a sub-layer having repeated instances of a cyan, magenta, yellow and black (CMYK) linear grouping.

Related color sub-layer orientations are illustrated in FIGS. 3A and 3B. Again, a single layer is used to carry multiple colors. But instead of a circular (or generally circular) pixel structure as shown in FIGS. 2A and 2C, a pixel includes a linear arrangement of sub-pixels (CMY or CMYK, etc.). A laser is used to provide openings through a surface layer to reveal desired sub-pixels. Again, multiple openings (at various sizes) per pixel provide a large range of colors per pixel. A linear orientation provides simple mathematics to convert a desired color (e.g., in a master image used to guide laser engraving) into a laser hole size and sub-pixel location relative to more complex calculations for circular orientations. In addition, the inks are deposited (e.g. printed) on the sub-layer in lines. In other words, card stock can be moved through an ink depositing process in a direction parallel to the color lines, thus reducing the likelihood of inks running into each other.

Figure 4A:
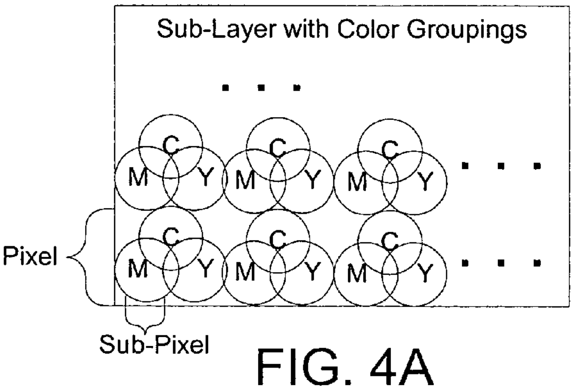
FIG. 4A shows a sub-layer having repeated instances of a cyan, magenta, and yellow (CMY) overlapping grouping.
Figure 4B:
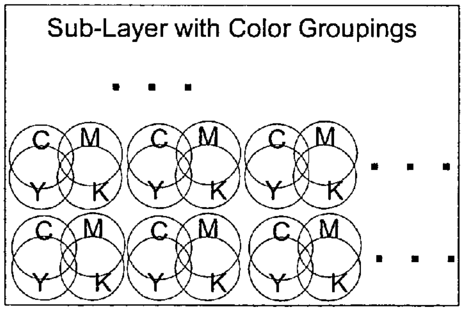
FIG. 4B shows a sub-layer having repeated instances of a cyan, magenta, yellow and black (CMYK) overlapping grouping.

Instead of occupying separate spatial areas, as shown in FIGS. 2 and 3, colors can be provided on a single sub-layer in an overlapping manner as shown in FIGS. 4A and 4B. The inks (e.g., CMY or CMYK) are arranged on a sub-layer surface to provide a complete color space or gamut, with a particular color within the gamut being activated by creating an opening at a spatial location corresponding with the particular color. Thus, the particular color is realized by laser engraving an opening at a pixel location (e.g., to realize a different color in the gamut) and at an intensity determined by opening size. Only one opening is required to achieve a desired color per pixel, as opposed to the multiple-hole approach discussed in some of the previous implementations.

Figure 5A:
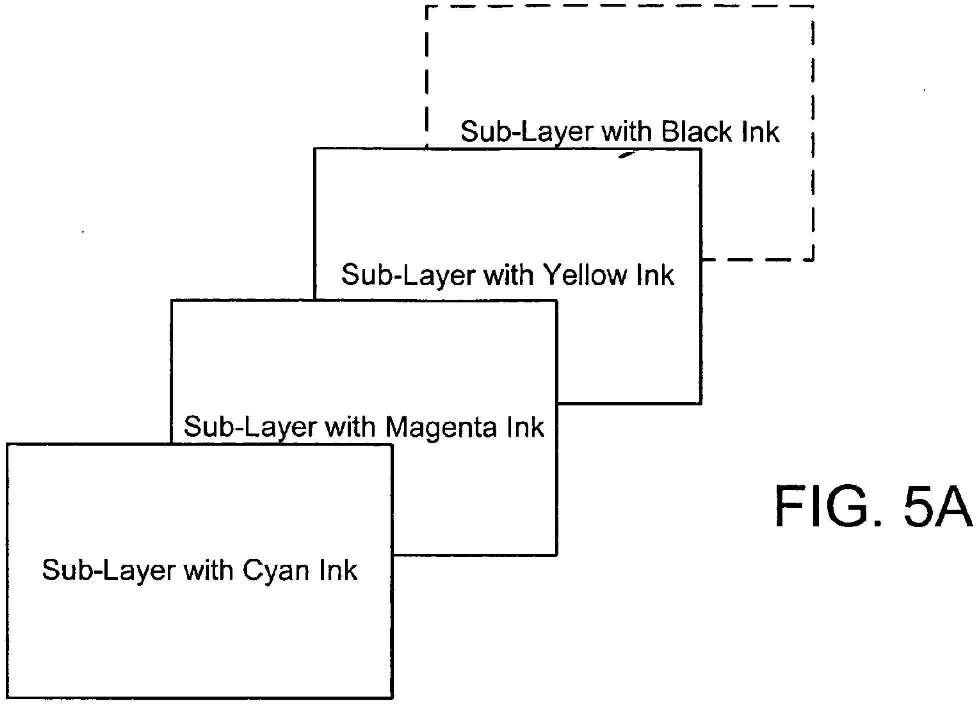
FIG. 5A is an exploded view showing a multi-layer sub-layer including cyan, magenta, yellow and black (optional) sub-layers.
Figure 5B:
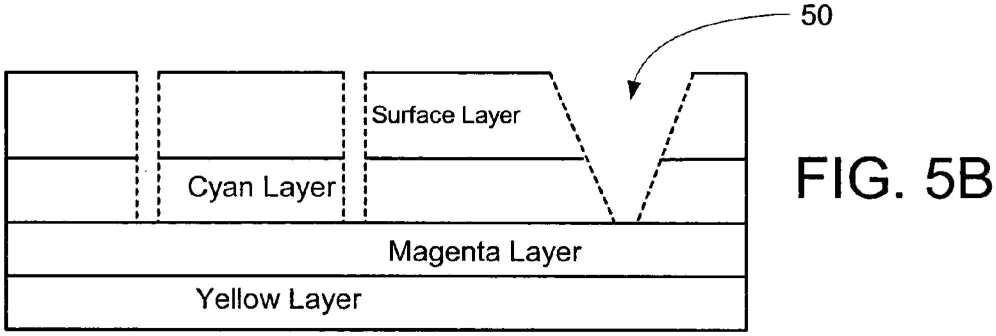
FIG. 5B is a cross-sectional view of a portion of the FIG. 5A sub-layer, including openings (represented by dashed lines) through a surface layer and the cyan sub-layer revealing the magenta sub-layer.

A sub-layer can include a plurality of layers. For example, with reference to FIG. 5A, a sub-layer may include a first color layer (e.g., cyan), a second color layer (e.g., magenta) a third color layer (e.g., yellow) and, optionally, a fourth or more color layer (e.g. black). At a particular spatial location, a laser provides an opening at a depth needed to reveal a desired color. For example, and with reference to FIG. 5B, if magenta is desired, a laser tunnels through both a surface layer and a cyan layer to reach the magenta layer. Depending on thickness and color depth of each layer, a laser may have some depth tolerance, e.g., the laser may be able to engrave into the magenta layer for a certain depth. Here again, multiple openings can be provided per pixel area to provide a range of colors per pixel. The openings can be, in some alternative implementations, tapered so that the overall color attributable to any one opening has multiple components (e.g., opening 50 in FIG. 5B.) If the tapered openings are large enough, the opening may have a "colored band" or bulls-eye appearance.

After laser engraving, an identification document is optionally laminated with a transparent material. Lamination helps prevent the laser engraved openings from clogging with debris.

Transfer of Image to Document

Transfer of an image pixel to laser hole(s) size and locations may depend upon the location and configuration of the color sub-layers.

For pixel groupings spatially dispersed over a sub-layer (e.g. FIGS. 2 and 3), one example process proceeds as follows:

1. An image is selected to guide laser engraving. The image is converted to a resolution corresponding to the sub-layer pixels. For example, if there are 320×240 pixels provided on a document sub-layer, the image is resampled to achieve a 320×420 resolution. Smoothing functions for resampling are preferable, such as provided in image editing products like Adobe's Photoshop®.
2. The image is converted to color channels that correspond to the sub-layer colors. For example, for CMYK colors in the sub-layer, the image is separated into individual CMYK channels. Such a conversion is straight forward using most image editing products like Photoshop®.
3. Each image color channel is matched to (or aligned with) an orientation of a corresponding sub-pixel color, e.g., a cyan channel is aligned with a cyan sub-pixel(s). Once one color channel is aligned, a distance of each sub-pixel width is preferably used to offset the remaining color channels from each other. This approach is particularly useful for rectangular color systems such as shown in FIG. 3, but also benefits configurations such as those FIGS. 2A and 2B depending on pixel/sub-pixel separation.
4. A laser burns holes in the surface layer to transfer each image color channel to the document. Each color channel can be engraved separately, or the laser engraving can focus on a pixel-based approached, where multiple color channels are imparted per pixel (e.g., by opening up a plurality of openings per pixel). The brightness of each pixel (e.g., corresponding to opening size) in the appropriate color channel corresponds to the power of the laser, such as laser intensity and/or a total time that a laser operates.

For colors in separate sub-layers separated by depth (e.g. FIG. 5A), one illustrative process proceeds as follows:

1. The image is converted to a resolution that the laser system can provide. For example, since sub-layer colors are continuous and have no inherent pixels boundaries, the resolution is determined by the laser systems ability to regulate location and hole size. For example, if the laser system can provide 320×240 resolution pixels, the image is changed to that resolution. Smoothing functions for resampling are preferable, such as provided in most image editing products like Adobe's Photoshop®.
2. Step 2 generally corresponds with step 2, above.
3. The color channel that is being burned to the card determines the distance of the laser focus from the card.
   a. The focus can be changed by physically moving the laser or document. For example, if cyan is being burned and it is the top sub-layer, the laser is position at a relatively far position. If magenta is being burned and it is the second sub-layer the laser is moved closer to the card by an amount similar to the thickness of the cyan layers, and so on for other layers. In this configuration it is optimal to burn one color channel at a time so the laser's depth is not changed.
   b. Alternatively, laser focus is changed to achieve different burning depths. This implementation is similar to 3a, but only the focus, as opposed to the laser's physical distance to a surface, is changed. Conventional optics and/or intensity adjustments are used to achieve variable focus changes.
4. The brightness of each pixel in the appropriate color channel corresponds to either:
   a. The power sent to the laser (e.g. time on and/or intensity); or
   b. The number of openings burned in that location to represent a pixel (e.g., similar to half-toning).

Alternatively, one implementation uses intensity for color channel selection (e.g., for a FIG. 5 arrangement). The process proceeds as follows:

1. Step 1 generally corresponds with step 1, above.
2. Step 2 generally corresponds with step 2, above.
3. A color channel that is being burned to a card determines laser intensity. For example, if cyan is being burned and cyan is the first sub-layer, a laser is set on a first, relatively lower intensity. The first intensity is calibrated to achieve an intensity to burn a hole through the surface layer to (or into) the cyan sub-layer. If magenta is being burned and it is the second sub-layer, the laser's intensity is calibrated to achieve a second, relatively higher intensity (or a time that a laser is on is increased) to burn a hole through the surface layer and cyan sub-layer to (or into) the magenta sub-layer. The resulting hole size in the magenta sub-layer is preferably the same as the cyan sub-layer. The process is continued for each further sub-layer, and for each pixel.
4. The brightness of each pixel in the appropriate color channel corresponds to the number of holes burned in the document to a color's depth for each pixel (e.g., analogous to halftoning).

For colors in one sub-layer that are overlapped (e.g. FIG. 4), one example engraving process proceeds as follows:

1. Step 1 generally corresponds with step 1, above.
2. A color value for each pixel is determined. The color values are mapped to predetermined spatial locations corresponding with the values.
3. The intensity of the pixels determines the power sent to a laser, such as laser intensity and/or time that the laser is left on. Openings are created with the laser at the predetermined spatial locations.

Of course, there are many other processes and methods that can be used in connection with our inventive engraving techniques to impart an image to a document (e.g., including a surface and sub-layer) via laser engraving.

Lasers

Figure 6A:
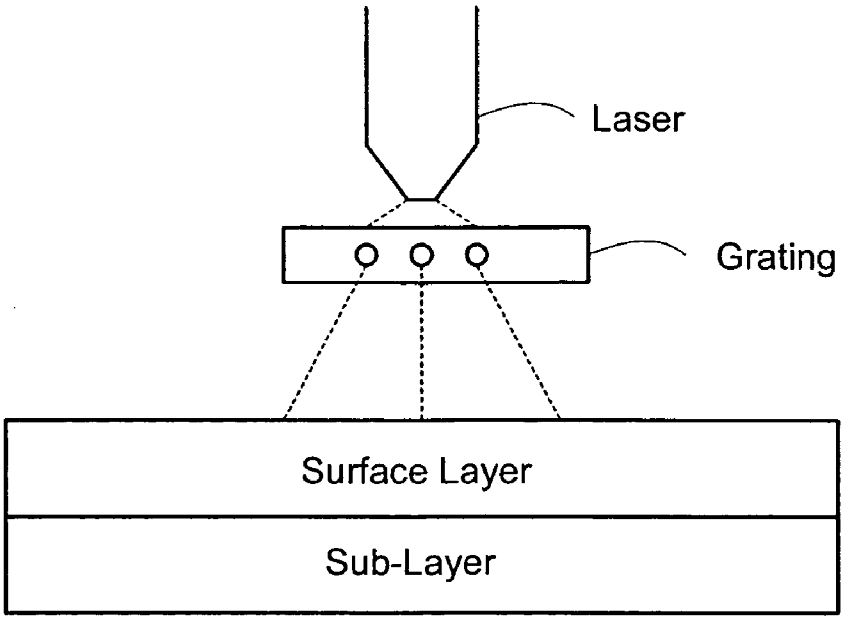
FIG. 6A illustrates a grating to facilitate concurrent laser engraving of multiple openings.
Figure 6B:
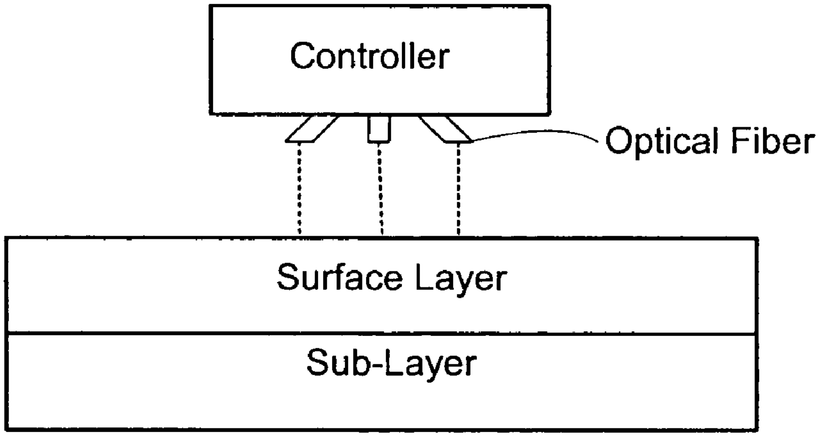
FIG. 6B illustrates a multi-nozzle laser to facilitate concurrent laser engraving of multiple openings.
Figure 8:
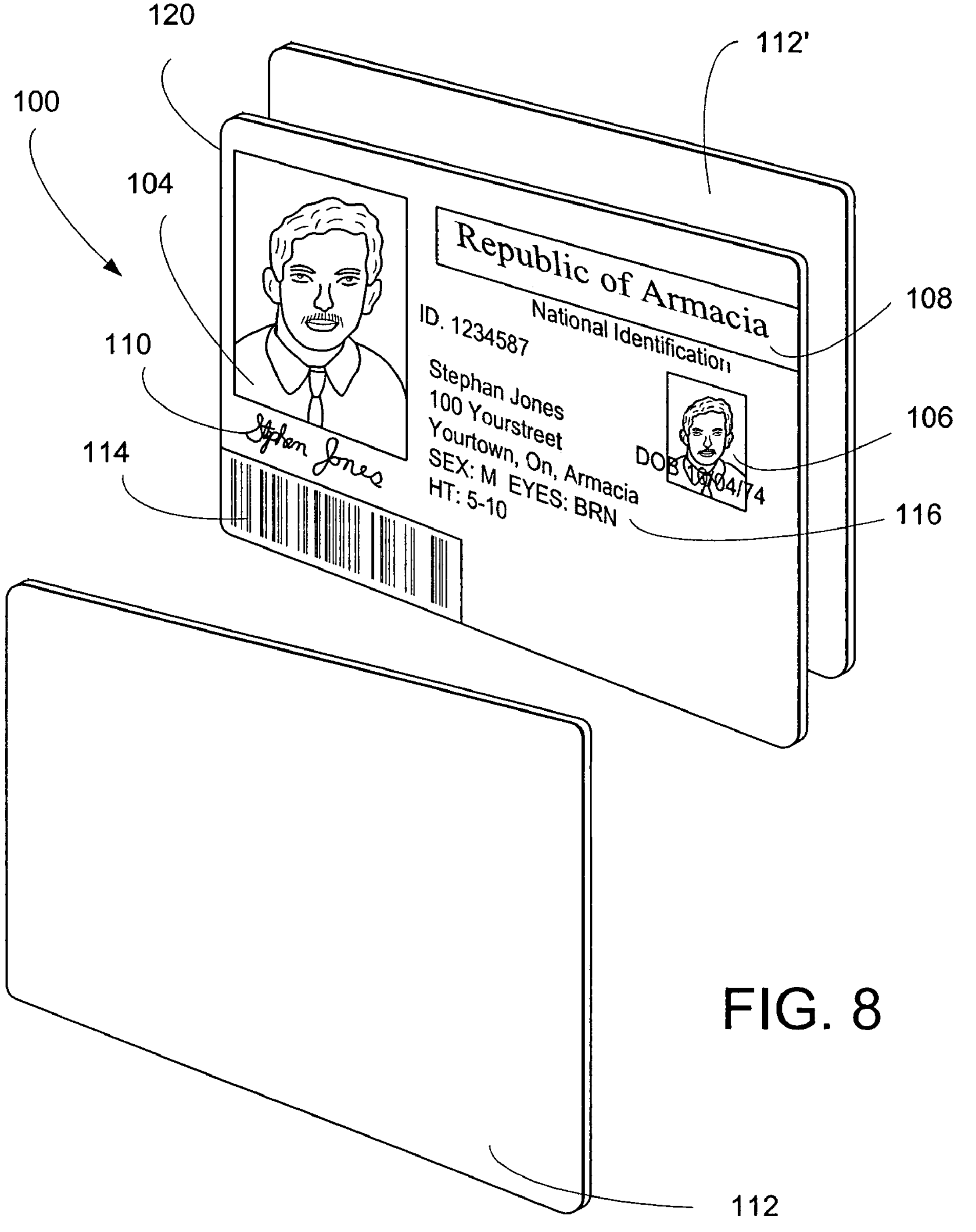
FIG. 8 illustrates an identification document.

Objects can be engraved with a single laser, which is controlled to variously engrave an image, text or graphic into an object. In some implementations, a laser is held stationary, while an object is moved relative to the stationary laser. The laser is controlled (turned on and off) as the object is positioned. In other implementations a grating is provided to diffract a laser. That is, a laser is dispersed with the grating to concurrently create multiple openings (FIG. 6A). The grating includes a fixed geometric pattern of openings, which in some implementations, can be selectably opened and closed (e.g., with an actuator and gate) to provide variable engraving. We also envision a multi-nozzle (or multiple optical fiber) laser, with each laser nozzle (or multiple optical fibers) being separately controlled to facilitate concurrent engraving of multiple openings (FIG. 6B).

In addition, multiple lasers can be used at once, where power to each laser is separately controlled. Each laser's location/intensity is preferably independently controlled. Optimally, the multiple lasers are in fixed locations and speed the process of transferring an image to an identification document. In a related implementation, we address media (e.g., ID document, engraving surface, etc.) from multiple sides. That is we engrave a media surface from a top surface and a bottom surface. (In this implementation, a sub-layer is preferably sandwiched between a top surface layer and a bottom surface layer.). Color laser engraving is provided to multiple sides (e.g., top and bottom) or multiple surfaces on the media. Color laser engraving of the multiple surfaces can be carried out simultaneously (or concurrently) and/or in sequence (e.g., first a top surface and then a bottom surface).

In an embodiment with multiple laser outputs (diffraction, multi-nozzle or multi-laser), the locations of the lasers are associated with a card sub-layer orientation of color. For example, for circular orientations (e.g. FIGS. 2B and 2C) or linear orientations (e.g. FIGS. 3A and 3B), lasers are grouped into sets of three (FIGS. 2B and 3A) or four (FIGS. 2C and 3B) where the location of each laser output within each set corresponds to a respective color and each set is offset by the size of a pixel. Several groups of laser outputs can be used at once. For overlapped orientations (e.g. FIGS. 4A and 4B), each laser output represents one pixel and the location of each laser is preferably independently controlled. For colors in separate sub-layers (e.g. FIG. 5A), the lasers are grouped into sets of three (e.g., CMY) or four (e.g., CMYK). Each individual laser location or focus direction represents a color (or sub-pixel) per pixel. Several laser sets can be used at once. Within each set, the lasers or focus directions can be offset in distance from the card for each color (or sub-pixel) or evenly spaced according to pixel placement.

Orientation and Registration

There are many ways to orientate or register a document for laser engraving. (Remember that the colors are obscured beneath a surface layer.) For example, a few "test" openings can be created to help find or register the colors for laser engraving (e.g., help determine where openings should be placed). For multi-colors on a single sub-layer, a laser can burn a few registration openings to create an orientation signal to align itself with sub-pixels. For example, resulting colors of three holes are used, in connection with a known orientation of CMY sub-pixels, to determine an orientation of the pixels (or columns/rows of pixels). More registration openings will lead to a stronger assurance of registration accuracy. (Some documents include a "test" area. The pixels/sub-pixels are registered to the test area during sub-layer creation. A few openings in the test area are provided to determine an orientation or registration of the document for laser engraving.)

In another implementation, the surface layer includes a small, transparent area. The alignment or positioning of colors is determined or registered through the transparent area. In still further implementations we base our engraving registration off of a visible mark or relative to a printed structure (e.g., lower right hand corner of a photograph). If the printing or sub-layer construction also aligns with the mark or printed structure, registering laser engraving on the same mark or structure helps properly orient the engraving process.

Digital Watermarking

Our color laser engraving techniques can be used to convey a so-called digital watermark.

Digital watermarking technology, a form of steganography, encompasses a great variety of techniques by which plural bits of digital data are hidden in some other object, preferably without leaving human-apparent evidence of alteration. Digital watermarking may be used to modify media content to embed a machine-readable code into the media content. The media may be modified such that the embedded code is imperceptible or nearly imperceptible to the user, yet may be detected through an automated detection process.

A digital watermark can have multiple components, each having different attributes. To name a few, these attributes include function, signal intensity, transform domain of watermark definition (e.g., temporal, spatial, frequency, etc.), location or orientation in host signal, redundancy, level of security (e.g., encrypted or scrambled), etc. The components of the watermark may perform the same or different functions. For example, one component may carry a message, while another component may serve to identify the location or orientation of the watermark. Moreover, different messages may be encoded in different temporal or spatial portions of the host signal, such as different locations in an image or different time frames of audio or video. In some cases, the components are provided through separate watermarks.

The physical manifestation of watermarked information most commonly takes the form of altered signal values, such as slightly changed pixel values, picture luminance, color or color intensity, picture colors, DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminance, local changes in contrast, etc. The surface texture of an object may be altered to create a watermark pattern. This may be accomplished by manufacturing an object in a manner that creates a textured surface or by applying material to the surface (e.g., an invisible film or ink) in a subsequent process. Watermarks can also be optically implemented in holograms or embedded in conventional paper watermarks.

Digital watermarking systems typically have two primary components: an embedding component that embeds the watermark in the media content, and a reading component that detects and reads the embedded watermark. The embedding component embeds a watermark pattern by altering data samples of the media content or by tinting as discussed above. The reading component analyzes content to detect whether a watermark pattern is present. In applications where the watermark encodes information, the reading component extracts this information from the detected watermark.

Some techniques for embedding and detecting watermarks in media signals are detailed in the assignee's U.S. Pat. Nos. 6,122,403 and 6,614,914, and in PCT patent application PCT/US02/20832 (published as WO 03/005291), which are each herein incorporated by reference.

Returning to combining our color laser engraving and digital watermarking, a watermark is preferably created according to one of two methods. For example:

Method 1: An image is select to guide laser engraving. The image's intensity, contrast and/or color are manipulated via standard watermark technology, e.g., subtle alterations are made to the image to convey the digital watermark signal. The slight alterations are engraved along with the image such that the laser engraved image includes the digital watermark.

Method 2: Intensity of CMY (or CMYK or spot colors, etc.) color used when forming sub-pixels on a sub-layer are manipulated to "pre-embed" a digital watermark signal. For example, the intensity of sub-pixels is subtly varied across rows and columns of pixels. The subtle variations convey a digital watermark. The digital watermark can be tiled or repeated to help ensure detection. The subtle variations are machine-detectable after an image or graphic is engraved. In the simplest form, only the K channel is used to carry the digital watermark.

For either method, the changes in intensity preferably use standard watermark techniques to carry a data payload, such as based upon modulation of a pseudorandom number (PN) sequence. The watermark payload is preferably unique per card and/or image.

With respect to watermarking method 2 for a multi-sub-layer card (e.g., a card including a separate sub-layer for each color), a separate watermark can be added to each color layer (i.e., each color layer includes a unique watermark). Each watermark layer includes subtle variations, e.g., in color intensity or contrast. The subtle variations are apparent when an image is engraved. Each watermark is preferably robust to errors since much of the color layer may not be visible depending upon the color composition of the image and/or text transferred to the card during engraving.

Figure 7A:
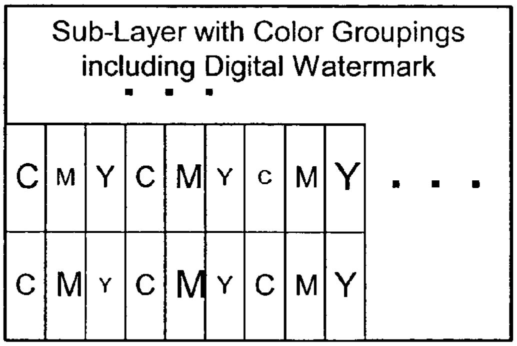
FIG. 7A shows a sub-layer with subtly varying inks to convey a digital watermark.
Figure 7B:
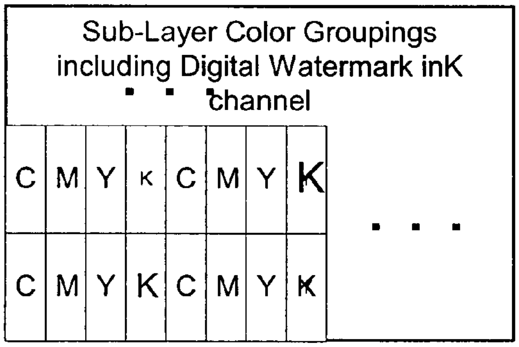
FIG. 7B shows a sub-layer with subtly varying black ink to convey a digital watermark.

FIG. 7 displays a digital watermark created by changing CMY inks on a sub-layer to pre-embed a unique watermark (e.g., method 2 above) using a PN sequence to modulate a watermark payload. The different size and boldness of the CMY letters represents subtle changes in the intensity of the respective color. The subtle changes convey the digital watermark. (For illustrative purposes, only the linear pixel grouping is illustrated, but this method is applicable to other groupings as well.)

The method 2 watermarking technique can also be applied to sensitive and color dye pairs for color laser engraving, as described in assignee's U.S. patent application Ser. No. 10/330,034, by changing an amount of sensitive and/or color dye to pre-watermark card stock.

A color in a sub-layer may change when hit by the laser, and this change can depend upon the size of the laser-created opening (e.g., intensity of the desired color). Such a change can be accounted for in the creation of a digitally watermarked document. Given a known change in color versus laser intensity function, the function and its inverse or pseudo-inverse can be used to create a base document and adjust laser settings. If changes in color vary upon laser intensity, a solution may requires a matrix operation due to the interaction of the colors, and many such solutions are known in the fields of mathematics and linear systems.

(The method 2 watermarking techniques can also be applied to pre-watermark TV and computer screens. Subpixels are provided so as to emit subtly varying intensities of red, green and blue phosphors. The different intensities become evident when hit by an electron gun for a CRT, or excited for an LCD display. A digital watermark signal is conveyed through a predetermined pattern of subtle variations of intensities. Each screen can include a unique pattern of different intensities. The pattern is machine-readable and conveys a unique identifier for its respective screen.)

Of course, the watermark in method 1 can include variable information about the card recipient and/or issuing system since the watermark is created at the time of card production. The watermark in method 2 is static and may include an embedded inventory number (EIN—a.k.a. embedded inventory control number) for the card stock. Since the EIN is inherently part of the card, it increases the security that the EIN cannot be changed later. For example, an ID card printer reads the EIN and verifies that the EIN is valid (i.e. the card is not stolen). The printer can be controlled on the validation determination. Thus, the printer can be limited to print onto only valid card stock. Thus, a counterfeiter cannot pay to use a legitimate printer with stolen card stock. This results in the counterfeiter having to use a different printer, thus reducing quality and increasing cost of counterfeiting. In addition, the EIN can be saved to a log (e.g., remote or local data repository) for auditing and tracking card stock.

Concluding Remarks

The foregoing are just exemplary implementations of the present invention. It will be recognized that there are a great number of variations on these basic themes. The foregoing illustrates but a few applications of the detailed technology. There are many others.

The section headings in this application are provided merely for the reader's convenience, and provide no substantive limitations. Of course, the disclosure under one section heading may be readily combined with the disclosure under another section heading.

To provide a comprehensive disclosure without unduly lengthening this specification, each of the above-mentioned patent documents is herein incorporated by reference. The particular combinations of elements and features in the above-detailed embodiments are exemplary only; the interchanging and substitution of these teachings with other teachings in this application and the incorporated-by-reference patents/applications are also contemplated.

In alternative implementations, black is not achieved with ink; but, rather, a black coloration is created through laser-caused discoloration of a sub-pixel. In other words, segments of the sub-layer can contain no ink, but produce grayish-black coloration when burnt with a laser.

In further alternative implementations, groupings of pixels (e.g., FIGS. 2, 3 and 4) are arranged in different patterns, e.g., approximating ovals, triangles, squares, trapezoids, hexagons, etc.

While the preferred implementations have been illustrated with respect to an identification document the present invention is not so limited. Indeed, the inventive methods can be applied to other types of objects or media that are suitable to receive laser engraving as well, including, but not limited to: checks, traveler checks, banknotes, legal documents, printed documents, in-mold designs, plastics, product packaging, labels and photographs.

The above-described methods and functionality can be facilitated with computer executable software stored on computer readable media, such as electronic memory circuits, RAM, ROM, magnetic media, optical media, memory sticks, hard disks, removable media, etc., etc. Such software may be stored and executed on a general-purpose computer, electronic processing circuitry or on a server for distributed use. Instead of software, a hardware implementation, or a software-hardware implementation can be used.

It should be appreciated that the terms "ink," "pigment," "color" and "dye" are used interchangeably herein to represent a material to achieve a color. In some cases a sub-layer may include a so-called fluorescing ink or dye. These types of ink emit when excited by UV or IR illumination. These fluorescing inks may be suitable interchanged with the ink discussed herein. (Suitable fluorescing ink is provided by, e.g., PhotoSecure in Boston, Mass., USA, such as those sold under the trade name SmartDYE™. Other cross-spectrum inks (e.g., inks which, in response to illumination in one spectrum, activate, transmit or emit in another spectrum) are available, e.g., from Gans Ink and Supply Company in Los Angeles, Calif., USA. Of course other ink or material evidencing the above or similar emission properties can be suitably interchanged herewith. The laser engraved image then only become perceptual with appropriate non-visible illumination through laser engraved openings.

Of course, equipment other than a laser may be used to create an opening, such as micro-drills made in silicon. Chemical processing may also provide selective openings. (We even imaging a photo-resist like process, where a mask identifies areas corresponding to openings. Ultraviolet (UV) light or other curing source is used to cure the surface layer, except for the openings, which are washed open—revealing the coloration of the sub-layer below. In a related implementation, a mask covers document areas—except for openings. A Chemical is applied to the document, eating away areas corresponding only to the unmasked openings.).

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method of color laser exposing a document, the document comprising a multi-layer structure including a surface layer and one or more sub-layers, the one or more sub-layers including coloring, said method comprising:

receiving the document; and selectively providing openings in the surface layer with a laser to expose one or more of the sub-layers, wherein the coloring is perceptible through the openings, and wherein the laser is restricted so as to move only in a parallel manner relative to a surface of the document and in distance segments that correspond to sub-pixel and pixel sizes in the sub-layer, and wherein a location of the laser is used to choose an appropriate color channel, and a number of openings created for each pixel is used to represent intensity of a color channel.

2. A method of marking a document which is to receive laser engraving, said method comprising:

providing one or more sub-layers, the one or more sub-layers to include coloration;

providing variations in the coloration in terms of at least one of color intensity and color contrast, the variations conveying a machine-readable plural-bit message; and arranging a surface layer over the one or more sub-layers, wherein the surface layer obscures the plural-bit message until laser engraving of at least a portion of the surface layer, after which the plural-bit message is machine-readable with optical scanning of the document.

3. The method of claim 2 wherein the plural-bit payload comprises a modulated pseudorandom noise sequence.

4. The method of claim 2, further comprising laser engraving the document, wherein the plural-bit message becomes machine-readable with analysis of optical scan data representing a document area that received the laser engraving.

5. The method of claim 4, wherein a laser used for laser engraving comprises a multi-nozzle laser.

6. The method of claim 5, where each of the nozzles comprises an optical fiber.

7. The method of claim 4, wherein a laser used for laser engraving comprises a diffraction grating.

8. The method of claim 2, wherein the machine-readable plural-bit message comprises a digital watermark component.

9. A method of providing a color image or pattern on media, the document comprising a multi-layer structure including a surface layer and one or more sub-layers, the one or more sub-layers including coloring, said method comprising:

receiving the document; and selectively providing openings in the surface layer to expose one or more of the sub-layers, wherein the coloring is perceptible through the openings to provide the color image or pattern, wherein the openings are washed open after a curing process.

* * * * *

UNITED STATES PATENT AND TRADEMARK OFFICE

CERTIFICATE OF CORRECTION

PATENT NO. : 7,763,179 B2
APPLICATION NO. : 10/742510
DATED : July 27, 2010
INVENTOR(S) : Levy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1471 days.

Signed and Sealed this
Fourth Day of January, 2011

David J. Kappos
*Director of the United States Patent and Trademark Office*